United States Patent
Harris et al.

(10) Patent No.: US 10,054,512 B2
(45) Date of Patent: Aug. 21, 2018

(54) LEAK INDICATOR

(71) Applicant: Beerenberg Corp. AS, Bergen (NO)

(72) Inventors: Geir Harris, Soreidgrend (NO); Olav Bjorn Lygre, Sern (NO)

(73) Assignee: Beerenberg Corp., Bergen (NO)

(*) Notice: Subject to any disclaimer, the term of this patent is extended or adjusted under 35 U.S.C. 154(b) by 303 days.

(21) Appl. No.: 14/780,282

(22) PCT Filed: Mar. 24, 2014

(86) PCT No.: PCT/NO2014/050042
§ 371 (c)(1),
(2) Date: Sep. 25, 2015

(87) PCT Pub. No.: WO2014/158027
PCT Pub. Date: Oct. 2, 2014

(65) Prior Publication Data
US 2016/0041062 A1    Feb. 11, 2016

(30) Foreign Application Priority Data
Mar. 25, 2013  (NO) .................................. 20130423

(51) Int. Cl.
*G01M 3/04* (2006.01)

(52) U.S. Cl.
CPC .............. *G01M 3/04* (2013.01); *G01M 3/042* (2013.01)

(58) Field of Classification Search
CPC ..................................................... G01M 3/04
USPC ........ 73/40.5 R; 116/200, 227, 264; 251/226
See application file for complete search history.

(56) References Cited

U.S. PATENT DOCUMENTS

| 5,327,931 A * | 7/1994 | Royalty .................... E03D 1/00 137/410 |
| 5,419,360 A * | 5/1995 | Lechevalier .......... F16L 23/167 116/264 |
| 6,182,507 B1 | 2/2001 | Sanford |
| 6,561,023 B2 * | 5/2003 | Woodall ................. G01N 19/10 73/335.06 |
| 2002/0017385 A1 * | 2/2002 | Woie ..................... E21B 49/008 166/250.02 |

(Continued)

FOREIGN PATENT DOCUMENTS

| DE | 3605633 A1 | 9/1987 |
| GB | 2273167 A | 6/1994 |

OTHER PUBLICATIONS

Supplementary European Search Report dated Sep. 29, 2016, for Application No. EP 14773708.4 (2 p.).

(Continued)

*Primary Examiner* — Lisa Caputo
*Assistant Examiner* — Tarun Sinha
(74) *Attorney, Agent, or Firm* — Conley Rose, P.C.

(57) ABSTRACT

The present invention concerns a liquid leakage detection apparatus. The apparatus includes a sample cavity, a housing with an opening and a housing contact face, an indicator body with an indicator body contact face, and a expansion element cavity between said housing contact face and said indicator body contact face. A liquid sensitive, expandable element is located in the expansion element cavity and a liquid path extends between the liquid collecting portion and the expansion element cavity.

20 Claims, 3 Drawing Sheets

(56) References Cited

U.S. PATENT DOCUMENTS

2009/0095074 A1* 4/2009 Vinshtok .............. G01D 11/245
                                                         73/431
2014/0216412 A1* 8/2014 Seong-Hwa ....... F02M 37/0017
                                                         123/468

OTHER PUBLICATIONS

International Search Report for PCT Application No. PCT/NO2014/050042 filed Mar. 24, 2014.
NIPO Search Report for priority Norwegian Application No. 20130423 filed Mar. 25, 2013.

* cited by examiner

FIG. 1
FIG. 2
FIG. 3
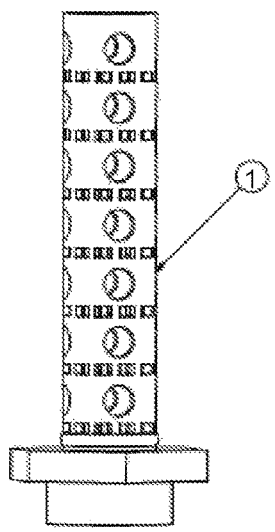
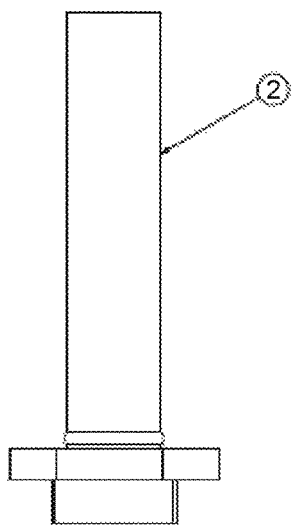
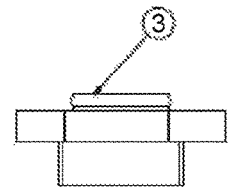
FIG. 4
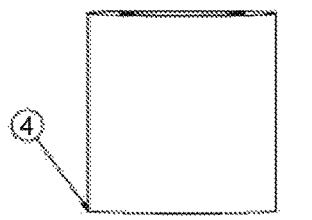
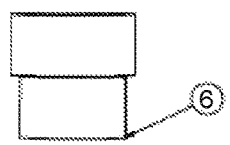
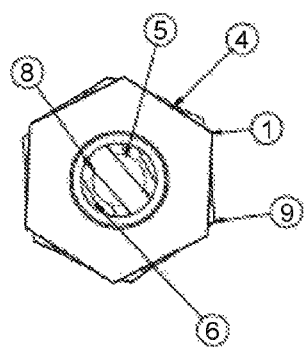
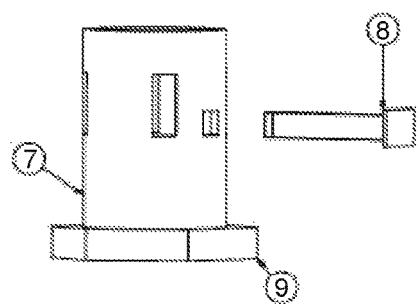

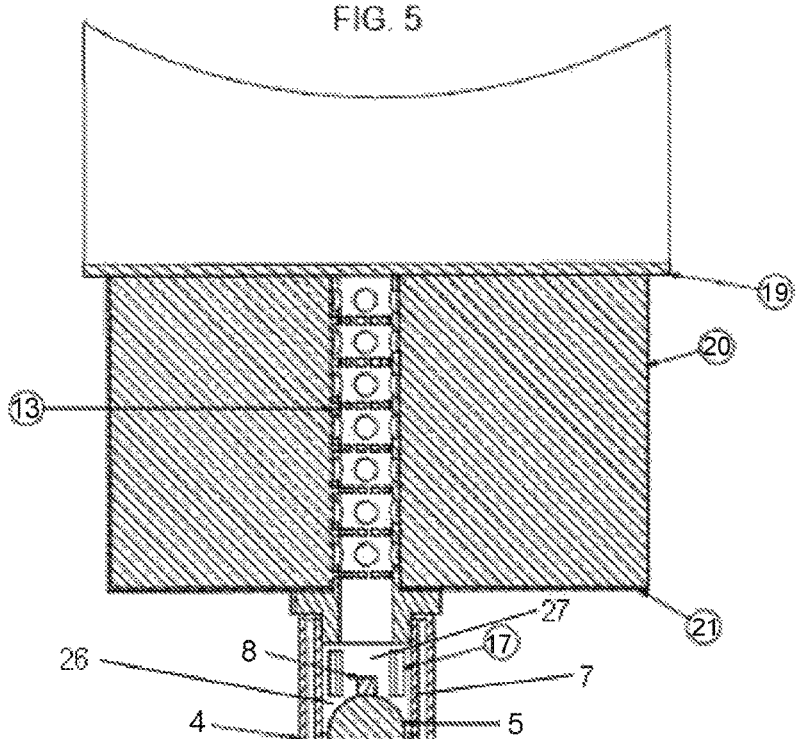
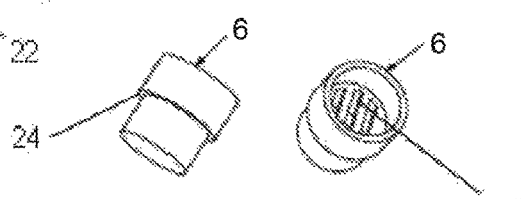
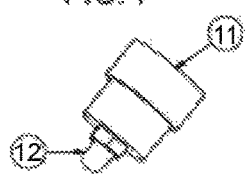

LEAK INDICATOR

This application is a national phase entry of International Application No. PCT/NO2014/050042, entitled "LEAK INDICATOR", filed on Mar. 24, 2013, and claims priority to Norwegian Patent Application No. 20130423 filed Mar. 25, 2013, the disclosure of each being hereby incorporated by reference in its entirety herein.

BACKGROUND

The present disclosure relates to a leak indicator for indicating leaks in insulating layers and other elements where an indication of liquid leaks is desired or required, and for sampling leaked liquid for further investigation.

Insulated pipelines, vessels, and steel structures are common in the process industry, on offshore installations, on vessels etc. Such insulation is common to reduce heat loss from the structure, to provide improved fire resistance for the structure, to reduce safety issues of hot surfaces and other reasons. Such insulation may however be problematic as it significantly impedes inspection of the underlying structure and tends to collect and maintain moisture and humidity. Rust and corrosion is a particular problem.

Identification of the presence of liquids is common in many applications and such identification techniques frequently rely on electric signals. Such measurements do however rely on electricity. Electricity may be problematic to use, in particular on installations where explosion hazards are present. Electric systems relying on batteries or an external electric power source also require more maintenance to ensure reliability. Such systems will typically only provide an indication of the presence of a liquid, but not a liquid sample.

A different type of system is shown in GB 2 273 167. This publication shows a fluid supply system with a leak detection device. A device includes a pad of fluorinated silicone which expands on contact with fuel to push a red button into view.

BRIEF SUMMARY OF THE DISCLOSURE

The present disclosure describes a means by which the presence of corrosive liquids is identified. Furthermore, the present disclosure describes a means for sampling the liquid for further test and to identify the likelihood of problems with corrosion arising.

Disclosed is a liquid leakage detection apparatus including an inlet and a liquid collecting portion, a housing with an opening and a housing contact face, an indicator body with an indicator body contact face, and a liquid sensitive, expanding element, expanding between a contracted dry state and an expanded wet state. An expansion element cavity is located between said housing contact face and said indicator body contact face. The liquid sensitive, expanding element is located in said expansion element cavity. A liquid path is formed between the liquid collecting portion and the expansion element cavity. A sample cavity for collecting a liquid sample of the liquid collected by the liquid leakage detection apparatus is formed in the indicator body, whereby the liquid path extends through the expansion element cavity and past said expansion element cavity when said expansion element is in the contracted state.

In other words, the volume of the liquid sensitive element increases upon contact with liquid. The liquid is typically water. A liquid path between the liquid collecting portion and the expansion element cavity allows the liquid to flow from the object where the presence of liquid is to be detected and onto the liquid sensitive, expanding element.

The indicator body may furthermore include a sample cavity for collecting a liquid sample of the liquid collected by the liquid leakage detection apparatus.

The housing contact face may be formed on a releasable lock pin.

The indicator body may be cup shaped and may include a first and a second diameter and a ledge between the first and the second diameter for contact with a ledge in the housing.

The sample cavity of the indicator body may include a nipple for draining the liquid sample.

The liquid leakage detection apparatus may further include a water protecting hood surrounding the housing to prevent liquid from the surroundings from entering the leakage detection apparatus and thus prevent a false reading or contamination of the liquid sample.

The housing may be formed with internal threads.

The liquid collecting portion may be formed as a tubular drain pipe.

The tubular drain pipe may be perforated and may include frangible portions.

The water protection hood may form an annular channel surrounding the housing.

The indicator body may be held in place in the sleeve shaped housing by friction.

A resilient friction element may be biased between the sleeve shaped housing and the indicator body.

The housing may be sleeve shaped.

The disclosure furthermore relates to a structure with an insulating layer, a cladding and a liquid leakage detection apparatus with a liquid collecting portion, a housing with an opening and a housing contact face, an indicator body with an indicator body contact face, an expansion element cavity between said housing contact face and said indicator body contact face, a liquid sensitive, expanding element in said expansion element cavity, a liquid path between the liquid collecting portion and the expansion element cavity, wherein the indicator body furthermore includes a sample cavity for collecting a liquid sample of the liquid collected by the liquid leakage detection apparatus. The leakage detection apparatus is installed on the cladding vertically on a substantially horizontal part of the cladding with the liquid collecting portion in line with the housing and the indicator body.

The disclosure further describes a structure with an insulating layer, a cladding and a liquid leakage detection apparatus as described above. A structure in this context includes insulated and encapsulated pipes, vessels, valves, flanges, tanks, equipment, structures and other items.

BRIEF DESCRIPTION OF THE DRAWINGS

FIG. 1 is an exploded view of a leak indicator with tubular perforated drain pipe;

FIG. 2 shows alternative tubular unperforated drain pipe;

FIG. 3 shows alternative short drain pipe;

FIG. 4 is a top view of a leak indicator;

FIG. 5 is a cross sectional view of a leak indicator mounted on pipe with insulation;

FIG. 6 is a detailed view of a first embodiment of an indicator body with a liquid collection portion;

FIG. 7 is a detailed view of a second embodiment of an indicator body with a liquid collection portion and a nipple for draining collected liquid;

FIG. 8 shows the interior of an indicator body.

DETAILED DESCRIPTION OF THE DISCLOSED EXEMPLARY

Embodiments

Figure 9:
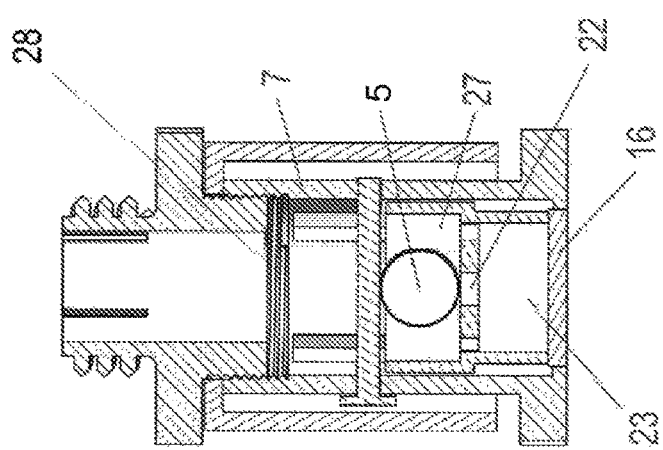
FIGS. 9-11 are cross sections of the disclosed liquid leakage detection apparatus and show various positions of an indicator body and the internal components of the liquid leakage detection apparatus.

FIG. 1 is an exploded view of a first embodiment of a leakage detection apparatus. The leakage detection apparatus includes a drain pipe 1 to collect fluid from the structure to be monitored, a hood 4 to prevent unwanted water penetration from the surroundings, a ball 5 of a hydrophilic elastomeric that expands upon contact with fluid, an indicator body 6, a sleeve shaped housing 7 with inner treads and a hex nut 9 for assembly and disassembly, and a lock pin 8.

The drain pipe 1 may be adapted for different uses and materials. In an application with a pipe inside a porous insulating material, the drain pipe will typically be designed as a perforated pipe with perforations for allowing liquid to seep into the plug and flow down to the ball 5 of a hydrophilic elastomer. The drain pipe 1 should therefore preferably be installed vertically or close to vertically to ensure that the liquid flows down to the ball 5 of a hydrophilic elastomer.

The drain pipe 1 of the embodiment of FIG. 1 is a drain pipe type for both insulation and cladding and include frangible portions to ease adjustment of length and thereby installation.

The end of the drain pipe 1 is threaded and is intended to be mated into threads on the housing 7. The housing 7 is surrounded by the hood 4 to prevent water from the surroundings (rain water, washing water etc.) from leaking into the housing accommodating the indicator body 6 and the ball 5 of a hydrophilic elastomer. The hood 4 preventing liquid from penetrating into the housing thus prevents false indication of leakage.

The housing 7 also includes transverse openings for the lock pin 8. The lock pin 8 holds the ball 5 in place. Removal or installation of the ball 5 can be performed by removing the lock pin 8. The hood 4 will hold the lock pin 8 in place until the housing 7 is unscrewed from the drain pipe 1, the hood 4 is withdrawn, and the lock pin 8 is revealed and is allowed to be removed or installed along with the ball 5.

The indicator body 6 includes a portion with a stepped diameter, forming a ledge. The ledge on the indicator body 6 will contact a ledge in the housing 7, thus preventing the indicator body 6 from being completely separated from the housing 7. The housing 7 furthermore includes a hex nut 9 for assembly and disassembly.

The indicator body 6 may include a liquid collection portion for collecting a liquid sample of the liquid flowing through the drain pipe 1. The indicator body 6 may include a nipple for collecting the liquid sample.

The housing 7 forms a housing with an opening and a housing contact face. The indicator body 6 includes an indicator body contact face and an expansion element cavity is formed between said housing contact face and said indicator body contact face. The housing contact face is formed by the lock pin 8. The expansion element cavity is located inside the housing 7. The ball 5 of a hydrophilic elastomer form a liquid sensitive element 1 located in the expansion element cavity. The drain pipe 1 and the housing 7 form a liquid path between the liquid collecting portion and the expansion element cavity.

The various parts may typically be made of a suitable plastic material. Alternatively, the parts may be made of metal. The materials must clearly be adapted to the implementation and must withstand external factors such as heat, acidic environments, solvents, frost etc.

FIG. 2 shows a tubular drain pipe 2 as an alternative embodiment for drainage inside insulation. The tubular drain pipe 2 is formed as a slick, continuous or imperforated pipe for conveying the liquid from for instance a pipe under an insulated layer, when the liquid is expected to follow the pipe and may be collected at the end of the drain pipe 2.

FIG. 3 shows an alternative embodiment of a drain pipe formed as a plug fitting 3 for drainage of cladding that typically can be installed at a bottom end of a cover around an insulated structure, where liquid can flow directly into the leakage detection apparatus.

The leakage detection apparatus can typically be delivered with the different drain pipes described above to adapt the leakage detection apparatus to different applications.

FIG. 4 is a top view of the leakage detection apparatus with a drain pipe 1, a hood 4 to prevent water penetration, a ball 5 of a hydrophilic elastomer, an indicator body 6, a lock pin 8 with a counter hold and a hex nut 9 for assembly and disassembly. The leakage detection apparatus may be assembled or disassembled by rotating the hex nut on the housing 7 with inner threads (FIG. 1) in relation to the hex nut on the drain pipe/plug fitting (1, 2 and 3 on FIGS. 1, 2 and 3 respectively).

In FIG. 4, the indicator body 6 is shown at the bottom of the leakage detection apparatus. The indicator body will typically be red or some other clearly visible colour to clearly indicate the presence of a liquid. FIG. 6 shows a detailed view of the indicator body 6, and the counter hold for the ball 5 and openings to drain liquid down to the collection portion. There should be a certain amount of friction between the indicator body 6 and the housing 7 to prevent the indicator body from being extended away from the housing 7, thus indicating the presence of a liquid before the ball 5 presses the indicator body 6 out of the housing 7.

FIG. 5 is a cross section of the leakage detection apparatus, installed in a cladding 21, covering insulation 20 around a pipe 19. The drain pipe 13 may be modified to correct length in situ by cutting off the drain pipe 13 as appropriate. The drain pipe 13 may include frangible areas allowing easy cutting with a knife, hacksaw or simply by allowing breaking off the drain pipe 13 by hand.

FIG. 5 clearly shows how the hood 4, protecting the leakage detection apparatus against water penetration from the outside, is held in place onto the drain pipe 13 by the sleeve shaped housing 7 for the ball 5 of a hydrophilic elastomer. The ball 5 is shown in an expanded state and the indicator body 16 in an extended position indicating the presence of liquid. The hood 4 also serves to hold the counterholding lock pin 8 in place and to prevent the lock pin 8 from being removed from its seats in the housing 7, and thus from being displaced allowing the ball 5 to get out of position.

FIG. 5 clearly shows that the indicator body 16 is cup shaped and includes a stepped diameter (a first and a second diameter) forming a ledge 24 for contact a ledge 25 in the housing 7, and for preventing the indicator body 16 from being completely separated from the housing 7.

The housing 7 also includes drain holes 17 for draining excess water out of the leakage detection apparatus. The indicator body 16 also includes a collector or sample cavity 23 for drainage liquids and for collecting samples that may be analysed to indicate the presence of corrosion. The sample cavity 23 includes a perforated section 22 preventing the ball 5 from entering the sample cavity 23.

The indicator body 16 is held in the housing by friction until the ball 5 presses the indicator body to the extended position indicating the presence of liquid. Alternatively, the indicator body 16 may be held in place by a frangible element that will break upon pressure from the expanding ball 5. Alternatively, there may be included a latching mechanism holding the indicator body for preventing inadvertent resetting of the indicator.

The indicator body 16 with an indicator body contact face and the housing 7, with a housing contact face forms an expansion element cavity 26 between the housing contact face and the indicator body contact face.

FIG. 6 shows an indicator body 6 of a type with a sample cavity for collecting a liquid sample. FIG. 6 clearly shows that the indicator body is cup shaped and includes a stepped diameter (a first and a second diameter) forming a ledge 24 for contact a ledge in the indicator housing, and for preventing the indicator body from being completely separated from the housing. The first diameter at the open end of the indicator body 6 is sufficient to hold the expanding ball, and hence the ball has a diameter in the expanded state that not exceeds the inner diameter of the first diameter at the open end of the indicator body 6. A perforated partition divides the open end with the first diameter from a closed end with a second diameter. The perforated partition ensures that the expanding ball not extends into the closed end of the indicator body and thus that there is sufficient room inside the indicator body to hold the liquid sample.

FIG. 7 shows an indicator body 11 similar to the indicator body 6 of FIG. 6, but where a nipple 12 for drainage of the liquid sample is included in the closed end of the indicator body. The nipple 12 is provided to ease the collection of a liquid sample and may cooperate with a suitable liquid sample collector with an element fitting onto the nipple 12.

The indicator body 11 may have an end portion of a neutral colour and a side portion of a signal colour such that when the indicator body is in a retracted position in the housing, no signal colour is visible, and when the indicator body is in an extended position, the signal colour at the side of the indicator body 11 is visible to ease visual inspection of the leakage detection apparatus.

The housing 7, indicator body 6, 11, ball 5 and the counter holding lock pin 8 may form an exchangeable assembly that may be exchanged upon indication of fluid or for inspection without removing the entire apparatus. The exchangeable assembly may be a single use assembly or a serviceable assembly. A single use, disposable assembly will typically not include the lock pin 8, but some other form of internal counter holding surface for providing an expansion element cavity for the ball 5. Furthermore, the ball 5 does not necessarily need to be ball shaped as such.

FIG. 8 shows the interior of an indicator body, where a counter holding, perforated partition 22 for allowing a fluid sample to flow to the bottom of the indicator body is shown. The ball will rest against this counter holding, perforated portion.

Figure 10:
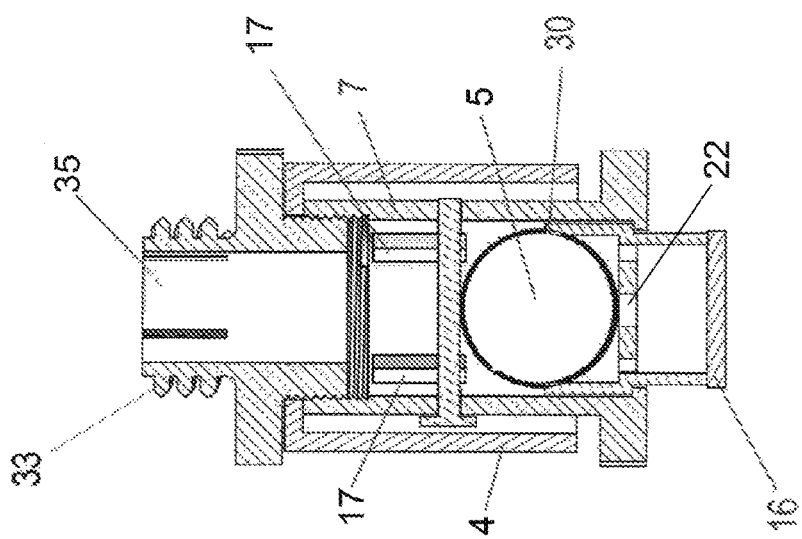
Figure 11:
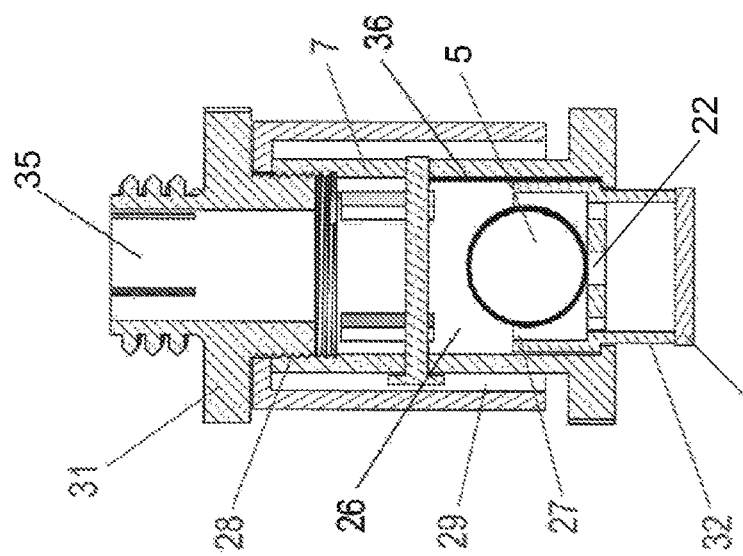

FIGS. 9-11 show cross sections in greater detail of the embodiment shown in FIG. 5, apart from the fitting 31 to the cladding or insulation. Apart from the seal 30 on FIG. 10, are all the reference numerals common for the FIGS. 9, 10 and 11, and the various reference numerals have been located on the different figures for convenience. FIG. 9 shows the liquid leakage detection apparatus in a first position, indicating that no liquid is detected, the ball 5 is in a first, dry, unexpanded state, and the indicator body 16 is in a retracted position.

FIG. 10 shows the liquid leakage detection apparatus in a second position, indicating that liquid is detected, the ball 5 is in a second, wet expanded state, and the indicator body 16 is in an extended position.

FIG. 11 shows the liquid leakage detection apparatus in a second position, indicating that liquid is detected, but the ball 5 is has dried and contracted somewhat, yet the indicator body 16 is in an extended position indicating that the presence of liquid has been detected at some stage, and that corrosion could be a problem. A latching mechanism (not shown) may be included to prevent inadvertent resetting of the indicator body 16. The latching mechanism may prevent someone from pushing the indicator body into the housing 7.

FIG. 9 furthermore shows a clearance forming a part of the liquid path 27 between the ball 5 and the indicator body 16 when the ball 5 is in the contracted state, thus allowing liquid to flow into the sample cavity 23 in the indicator body 16. The indicator body 16 may be of a translucent material or may include a translucent portion to show that a sample is present in the sample cavity 23. The indicator body 16 may also include a coloured portion 32 around a perimeter of the lower part that becomes visible when the indicator body 16 is in an extended position to ease visible reading of the indication of a fluid.

Drainage holes 17 may be included to prevent excessive accumulation of liquid to allow the plug to act as a drainage plug to prevent further corrosion and to prevent breakage in the event of frost. The drainage holes 17 leads excess liquid out through an annular channel 29 formed between the sleeve shaped housing 7 and the hood 4. The hood 4 includes an inner ring shaped ledge surrounding an outer portion of a fitting 31, and that is held between a nut portion on the fitting 31 and an edge on the sleeve shaped fitting 7. A threaded connection 28 between the fitting 31 and the sleeve shaped housing 7 holds the hood 4 and the sleeve shaped housing 7 to the fitting 31. The fitting 31 may form a liquid collecting portion. The indicator body 16 may be made of a material that will withstand expansion in the event of frost to prevent breakage of the indicator body 16 and loss of the sample fluid.

The leakage detection apparatus should be placed in an upright, vertical position to allow the liquid to flow into the sample cavity 23 of the indicator body 16. A drainage nipple as shown on FIG. 7 may of course also be included in the embodiment shown on the FIGS. 9-11.

The ball 5 may, as shown on FIG. 10, form a seal 30 around an upper perimeter of the indicator body 16 to retard evaporation of the fluid sample. The fitting 31 includes an upper cladding attachment portion 33 with threads or latching and sealing elements for attaching the fitting 31 to the cladding on the outside of the insulation of the pipe or tube to be monitored. The liquid leakage detection apparatus is installed vertically with the fitting 31, in line with the sleeve shaped housing 7, the indicator body 16 and the hood 4. The fitting 31 forms an inlet 35 and includes a central bore aligned with the sleeve shaped housing 7. The liquid path 27 extends through the bore of the fitting 31, the sleeve shaped housing 31, past the ball 5, through the perforations 22 and into the sample cavity 23. The indicator body is held in place in the sleeve shaped housing by friction. The friction may be induced by a resilient friction element 36 biased between the sleeve shaped housing 7 and the indicator body 16. The resilient friction element 36 may be a separate element or may be formed as an integral part of the sleeve shaped housing 7 or the indicator body 16. An insulated pipe with a leakage detection apparatus as described above may also be attached at the outer perimeter of the insulation at the lowermost position on a vertical axis of the outer perimeter of the pipe.

The fluid sample may be extracted and may be sent to a suitable laboratory for analysis to identify for instance rust or other types of corrosion. The sample may also form a smelling sample for indication by a suitably trained dog or other animal.

What is claimed is:

1. A liquid leakage detection apparatus comprising:
   a liquid inlet and a liquid collecting portion;
   a housing with an opening and a housing contact face;
   an indicator body with an indicator body contact face; and
   a liquid sensitive, expandable element, configured to expand between a contracted dry state and an expanded wet state;
   an expansion element cavity between said housing contact face and said indicator body contact face wherein the liquid sensitive, expandable element is located in said expansion element cavity;
   a liquid path between the liquid collecting portion and the expansion element cavity;
   wherein the indicator body includes the liquid collecting portion for collecting a liquid sample of the liquid collected by the liquid leakage detection apparatus; and
   whereby the liquid path extends through the expansion element cavity and past said expansion element cavity when said expansion element is in the contracted state.

2. The liquid leakage detection apparatus of claim 1 wherein the liquid sensitive element comprises a hydrophilic elastomer.

3. The liquid leakage detection apparatus of claim 1, wherein the indicator body is cup shaped and includes a first and a second diameter and a ledge between the first and the second diameter, the ledge configured to contact a ledge in the housing.

4. The liquid leakage detection apparatus of claim 2 further including a water protection hood surrounding the housing.

5. The liquid leakage detection apparatus of claim 2 wherein the housing includes internal threads.

6. The liquid leakage detection apparatus of claim 1, wherein the liquid collecting portion is a plug fitting.

7. The liquid leakage detection apparatus of claim 1 further comprising a tubular drain pipe connected to the housing, the drain pipe being free of perforations.

8. The liquid leakage detection apparatus of claim 1 further comprising a tubular drain pipe connected to the housing, wherein the tubular drain pipe comprises perforations and frangible portions.

9. The liquid leakage detection apparatus of claim 4 wherein the water protection hood forms an annular channel surrounding the housing.

10. The liquid leakage detection apparatus of claim 4 wherein the indicator body is held in place in the sleeve shaped housing by friction.

11. The liquid leakage detection apparatus of claim 10, wherein a resilient friction element is disposed between the housing and the indicator body.

12. The liquid leakage detection apparatus of claim 2 wherein the housing is sleeve shaped.

13. A system for detecting leakage, comprising:
    a structure with an insulating layer and a cladding disposed over the insulating layer;
    a liquid leakage detection apparatus comprising:
       a liquid collecting portion;
       a housing with an opening and a housing contact face;
       an indicator body with an indicator body contact face;
       an expansion element cavity between said housing contact face and said indicator body contact face;
       a liquid sensitive, expanding element in said expansion element cavity;
    a liquid path between the liquid collecting portion and the expansion element cavity, wherein the liquid path extends around the expanding element;
    wherein the indicator body furthermore includes the liquid collecting portion for collecting a liquid sample of the liquid collected by the liquid leakage detection apparatus; and
    wherein the leakage detection apparatus is installed on the cladding vertically on a substantially horizontal part of the cladding with the liquid collecting portion in line with the housing and the indicator body.

14. The liquid leakage detection apparatus of claim 2 wherein the liquid sensitive element is a ball.

15. The liquid leakage detection apparatus of claim 2 further comprising a tubular drain pipe connected to the housing, wherein the tubular drain pipe comprises perforations; and
    wherein the indicator body is cup shaped and includes a first and a second diameter and a ledge between the first and the second diameter, the ledge configured to contact a ledge in the housing.

16. The liquid leakage detection apparatus of claim 3 further comprising a lock pin disposed through aligned opening in the housing, the lock pin forming the housing contact face.

17. The liquid leakage detection apparatus of claim 16 further comprising a water protection hood disposed about the housing and about the lock pin.

18. The liquid leakage detection apparatus of claim 3 wherein the indicator body is configured to slide within the housing in response to expansion of the liquid sensitive element.

19. The liquid leakage detection apparatus of claim 18 wherein the liquid path between the liquid collecting portion and the expansion element cavity includes a perforated portion of the indicator body that is configured to engage the liquid sensitive element.

20. A liquid leakage detection apparatus comprising:
    tubular drain pipe;
    a housing connected to the drain pipe and comprising an opening for receiving liquid from the drain pipe;
    a pin disposed through the housing and defining a housing contact face;
    an indicator body slidingly disposed in the housing and including an indicator body contact face and a liquid collecting portion for collecting a sample of the liquid received from the drain pipe;
    an expansion element cavity between said housing contact face and said indicator body contact face;
    a liquid sensitive, expandable element disposed in said expansion element cavity and configured to expand between a contracted dry state and an expanded wet state;
    a liquid path between the liquid collecting portion and the expansion element cavity.

* * * * *